United States Patent
Katzourakis et al.

(10) Patent No.: US 11,654,932 B2
(45) Date of Patent: May 23, 2023

(54) ARCHITECTURE FOR VARIABLE MOTION CONTROL ENVELOPE

(71) Applicant: WAYMO LLC, Mountain View, CA (US)

(72) Inventors: Diomidis Katzourakis, San Jose, CA (US); Andrew Barton-Sweeney, Oakland, CA (US); Rami Hindiyeh, Pacifica, CA (US); Peter Greene, Sunnyvale, CA (US); Vadim Butakov, Belmont, CA (US)

(73) Assignee: Waymo LLC, Mountain View, CA (US)

( * ) Notice: Subject to any disclaimer, the term of this patent is extended or adjusted under 35 U.S.C. 154(b) by 56 days.

(21) Appl. No.: 17/135,259

(22) Filed: Dec. 28, 2020

(65) Prior Publication Data

US 2022/0204017 A1    Jun. 30, 2022

(51) Int. Cl.
*B60W 60/00* (2020.01)
*G01C 21/34* (2006.01)
(Continued)

(52) U.S. Cl.
CPC ....... *B60W 60/001* (2020.02); *G01C 21/3461* (2013.01); *G01C 21/3691* (2013.01);
(Continued)

(58) Field of Classification Search
CPC ......... B60W 60/001; B60W 2520/105; B60W 2520/125; B60W 2552/20; G01C 21/3461; G01C 21/3691; G06V 20/56
See application file for complete search history.

(56) References Cited

U.S. PATENT DOCUMENTS

| 8,510,041 B1 | 8/2013 | Anguelov et al. |
| 9,120,485 B1 | 9/2015 | Dolgov |

(Continued)

FOREIGN PATENT DOCUMENTS

| JP | H11083501 | | 3/1999 | |
| JP | 2004196046 A | * | 7/2004 | ............ B60T 8/1755 |
| KR | 20070064490 A | | 6/2007 | |

OTHER PUBLICATIONS

English Translation JP2004196046A.*
(Continued)

*Primary Examiner* — Rami Khatib
(74) *Attorney, Agent, or Firm* — Botos Churchill IP Law

(57) ABSTRACT

The technology employs a variable motion control envelope that enables an on-board computing system of a self-driving vehicle to estimate future vehicle driving behavior along an upcoming path, in order to maintain a desired amount of control during autonomous driving. Factors including intrinsic vehicle properties, extrinsic environmental influences and road friction information are evaluated. Such factors can be evaluated to derive an available acceleration model, which defines an envelope of maximum longitudinal and lateral accelerations for the vehicle. This model, which may identify dynamically varying acceleration limits that can be affected by road conditions and road configurations, may be used by the on-board control system (e.g., a planner module of the processing system) to control driving operations of the vehicle in an autonomous driving mode.

18 Claims, 15 Drawing Sheets

(51) Int. Cl.
 *G01C 21/36* (2006.01)
 *G06V 20/56* (2022.01)
(52) U.S. Cl.
 CPC ....... *G06V 20/56* (2022.01); *B60W 2520/105* (2013.01); *B60W 2520/125* (2013.01); *B60W 2552/20* (2020.02)

(56) References Cited

U.S. PATENT DOCUMENTS

| | | | |
|---|---|---|---|
| 9,180,890 | B2 | 11/2015 | Lu et al. |
| 9,551,992 | B1 | 1/2017 | Barton-Sweeney et al. |
| 9,740,202 | B2 | 8/2017 | Barton-Sweeney et al. |
| 10,308,282 | B2 | 6/2019 | Katzourakis et al. |
| 10,384,672 | B1 | 8/2019 | Katzourakis et al. |
| 10,569,784 | B2 | 2/2020 | Stark et al. |
| 2001/0029419 | A1 | 10/2001 | Matsumoto et al. |
| 2007/0142996 | A1* | 6/2007 | Lee .......................... B60T 7/22 701/96 |
| 2010/0228427 | A1 | 9/2010 | Anderson et al. |
| 2012/0065861 | A1 | 3/2012 | Hartmann et al. |
| 2016/0214608 | A1* | 7/2016 | Packwood-Ace ..... B60W 30/14 |
| 2018/0067487 | A1 | 3/2018 | Xu et al. |
| 2018/0244271 | A1* | 8/2018 | Krueger ................ B60W 30/16 |
| 2019/0113916 | A1 | 4/2019 | Guo et al. |
| 2021/0089039 | A1* | 3/2021 | Schultz ................ G05D 1/0221 |
| 2021/0171037 | A1* | 6/2021 | Matsumoto ............. B60T 7/122 |
| 2022/0212677 | A1* | 7/2022 | Zheng ................ B60T 8/17551 |

OTHER PUBLICATIONS

Bae, Il , et al., Driving Preference Metric-Aware Control for Self-Driving Vehicles, International Journal of Intelligent Engineering & Systems, 2019, pp. 157-166.
Behere, Sagar , et al., A functional architecture for autonomous driving, ACM, 2015, pp. 1-8.
Biral, Francesco , et al., An interpretative model of g-g diagrams of racing motorcycle, Proceedings of the 3rd ICMEM, 2009, pp. 1-6.
Goring, Jona , Understanding Friction Circles, Jonathan Goring Motorsports, LLC, 2019, pp. 1-13.
Kritayakirana, Krisada , et al., Autonomous vehicle control at the limits of handling, Int. J. Vehicle Autonomous Systems, vol. 10, No. 4, 2012, pp. 271-296.
Liu, Rui , et al., Statistical Characteristics of Driver Accelerating Behavior and Its Probability Model, 2019, pp. 1-8.
Michael , The G-G Diagram: A Quick and Easy Way to Analyse a Vehicle and Driver's Performance, 2020, pp. 1-12.
Ni, Jun , et al., Envelope Control for Four-Wheel Independently Actuated Autonomous Ground Vehicle Through AFS/DYC Integrated Control, IEEE Transactions on Vehicular Technology, vol. 66, No. 11, 2017, pp. 9712-9726.
Wang, Rongrong , et al., Linear Parameter-Varying Controller Design for Four-Wheel Independently Actuated Electric Ground Vehicles With Active Steering Systems, IEEE Transactions On Control Systems Technology, vol. 22, No. 4, Jul. 2014, pp. 1-17.
International Search Report and Written Opinion for Application No. PCT/US21/61153 dated Mar. 24, 2022 (7 pages).

\* cited by examiner

150

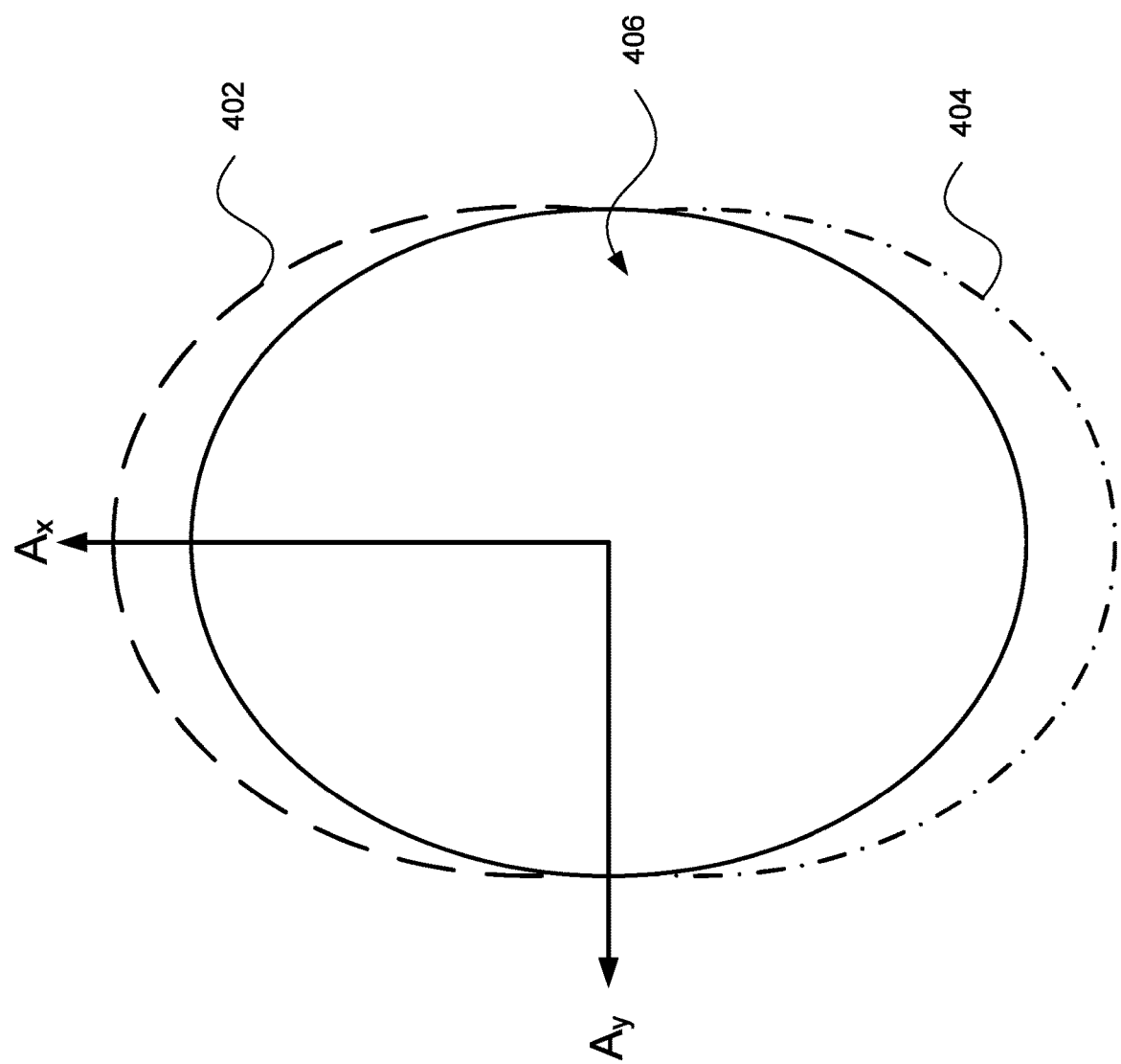

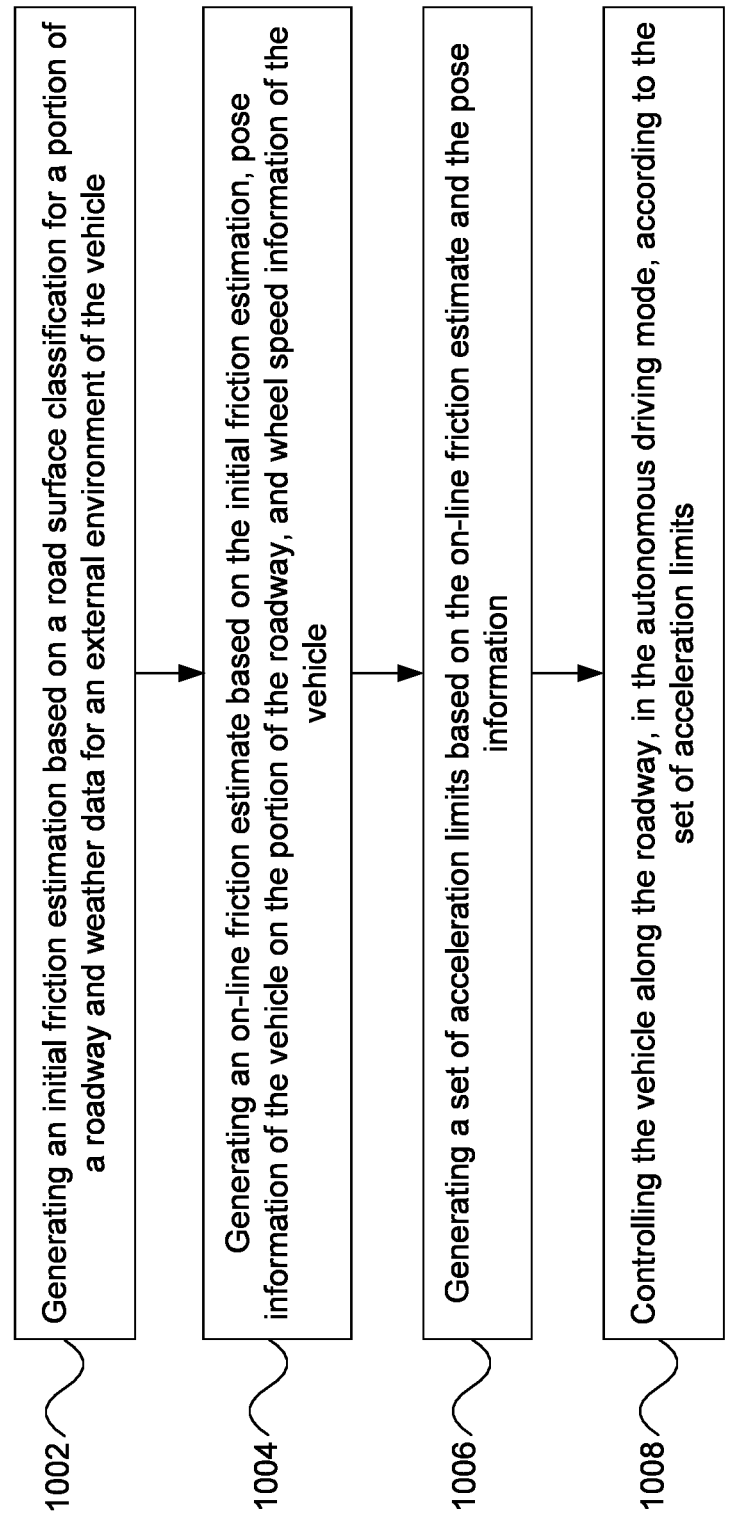

ARCHITECTURE FOR VARIABLE MOTION CONTROL ENVELOPE

BACKGROUND

Self-driving vehicles that operate in an autonomous driving mode may transport passengers, cargo or other items from one location to another. Vehicle handling is constrained, in part, by the friction interaction of tires and the road surface, the available actuation forces produced by the vehicle, and forces due to external factors such as road grade, bank, wind gusts, etc. Such constraint factors can significantly affect ongoing driving operations and path planning for upcoming portions of a trip.

BRIEF SUMMARY

The technology relates to employing a variable motion control envelope that allows the on-board computing system of a self-driving vehicle to estimate future vehicle behavior along an upcoming path, in order to maintain desired control during autonomous driving. Various factors such as intrinsic vehicle properties and extrinsic environmental influences are evaluated. Different factors may be readily quantifiable (e.g., vehicle center of gravity), may change in a discrete or deterministic manner (e.g., a steering electronic control unit failure), or may be highly variable in the spatial and/or temporal domains (e.g., changes in road surface friction due to precipitation, oil or other substances). Such factors may be evaluated to derive an available acceleration model, which defines an envelope of maximum longitudinal and lateral accelerations for the vehicle. This model, which may identify dynamically varying acceleration limits that can be affected by road conditions and road configurations, may be used by the on-board control system (e.g., a planner module of the processing system) to control driving operations of the vehicle in an autonomous driving mode.

According to one aspect, a method of operating a vehicle in an autonomous driving mode is provided. The method comprises estimating, by one or more processors of the vehicle, a local friction envelope based on at least one of road surface information and tire state data from one or more tires of the vehicle; estimating, by the one or more processors, an external force impact on the vehicle based on at least one of a local gravity vector and environmental forces; estimating, by the one or more processors, an internal force impact on the vehicle based on at least one of steering, braking, propulsion or vehicle kinetic information of the vehicle; generating, by the one or more processors, an available acceleration model for the vehicle based on the estimated local friction envelope, the estimated external force impact and the estimated internal force impact; producing, by the one or more processors, a traction generation profile based on the available acceleration model; and controlling the vehicle, by the one or more processors in the autonomous driving mode, according to the traction generation profile.

In one example, controlling the vehicle includes at least one of changing a driving action or updating an operating plan for an upcoming section of roadway. In another example, the traction generation profile comprises a variable motion control envelope that is updated periodically during operation in the autonomous driving mode. In a further example, the traction generation profile comprises a variable motion control envelope that is updated between iterations of a path generated by the one or more processors. In yet another example, the traction generation profile comprises a variable motion control envelope that is updated upon occurrence of an action, event or condition impacting the motion control envelope.

The method may further include updating the traction generation profile spatially according to different segments of a roadway.

Estimating the local friction envelope may be based on the tire state data, longitudinal and lateral slip information, and an adaptive value for a friction coefficient of the road surface information. The local gravity vector may be a measure of a local bank and a grade of a roadway segment. The environmental forces may include wind disturbance information.

According to another aspect, a vehicle is configured to operate in an autonomous driving mode. The vehicle comprises a perception system including one or more sensors configured to receive sensor data associated with an external environment of the vehicle including a portion of a roadway; a driving system including a steering subsystem, an acceleration subsystem and a deceleration subsystem to control driving of the vehicle; a positioning system configured to determine a current position of the vehicle; and a control system including one or more processors. The control system is operatively coupled to the driving system, the perception system and the positioning system. The control system is configured to estimate a local friction envelope based on at least one of road surface information and tire state data from one or more tires of the vehicle; estimate an external force impact on the vehicle based on at least one of a local gravity vector along the portion of the roadway and environmental forces in the external environment; estimate an internal force impact on the vehicle based on at least one of steering, braking, propulsion or vehicle kinetic information of the vehicle; generate an available acceleration model for the vehicle based on the estimated local friction envelope, the estimated external force impact and the estimated internal force impact; produce a traction generation profile based on the available acceleration model; and control the vehicle in the autonomous driving mode according to the traction generation profile.

According to a further aspect, a method of operating a vehicle in an autonomous driving mode includes generating, by one or more processors of the vehicle, an initial friction estimation based on a road surface classification for a portion of a roadway and weather data for an external environment of the vehicle; generating, by the one or more processors, an on-line friction estimate based on the initial friction estimation, pose information of the vehicle on the portion of the roadway, and wheel speed information of the vehicle; generating, by the one or more processors, a set of acceleration limits based on the on-line friction estimate and the pose information; and controlling the vehicle along the roadway, by the one or more processors in the autonomous driving mode, according to the set of acceleration limits.

Generating the initial friction estimate may include adjusting friction bounds according to a wetness along the portion of the roadway. Generating the initial friction estimate may alternatively or additionally include weighting the road surface classification more heavily than the weather data.

The on-line friction estimate may be further based on additional information associated with how much torque is applied to one or more tires of the vehicle. Here, the additional information may include at least one of actuation forces or a tire normal force estimation. The on-line friction estimate may be adaptive in real-time during driving along the portion of the roadway in accordance with the pose information and wheel speed information.

Generating the set of acceleration limits may include generating a set of corrective control inputs and recovery state information. Here, the recovery state information may provide a target trajectory for stabilizing the vehicle.

The set of acceleration limits may be associated with a set of corrective control inputs and a set of primary control inputs. In this case, the set of corrective control inputs is obtained from the on-line friction estimate and the pose information, and the set of primary control inputs is obtained from the on-line friction estimate and trajectory information of the vehicle. Here, controlling the vehicle may be performed based on a combination of the corrective control inputs and the primary control inputs.

BRIEF DESCRIPTION OF THE DRAWINGS

FIG. 4 illustrates an example envelope of feasible accelerations in accordance with aspects of the technology.

FIG. 10 illustrates another example method in accordance with aspects of the technology.

DETAILED DESCRIPTION

A functional architecture is provided for a self-driving vehicle that can manage a variable motion control envelope that is impacted by various factors, including rapidly changing environmental conditions, tire wear and actuator states. Intrinsic and extrinsic forces are evaluated, including looking at both the ranges of accelerations the vehicle can produce and the range of external disturbance accelerations, for instance to determine whether the sum of such accelerations would be less than a limiting acceleration due to friction of the tires on the road surface. Feasible and stable planning can be achieved in various vehicle/environmental states when the computer system (e.g., a planner module of the on-board processing system) uses an available acceleration (and accelerate rate) model to create driving plans that take into account modified lateral and longitudinal acceleration limits which are dynamic in time and space.

Example Vehicle Systems

Figure 1A:
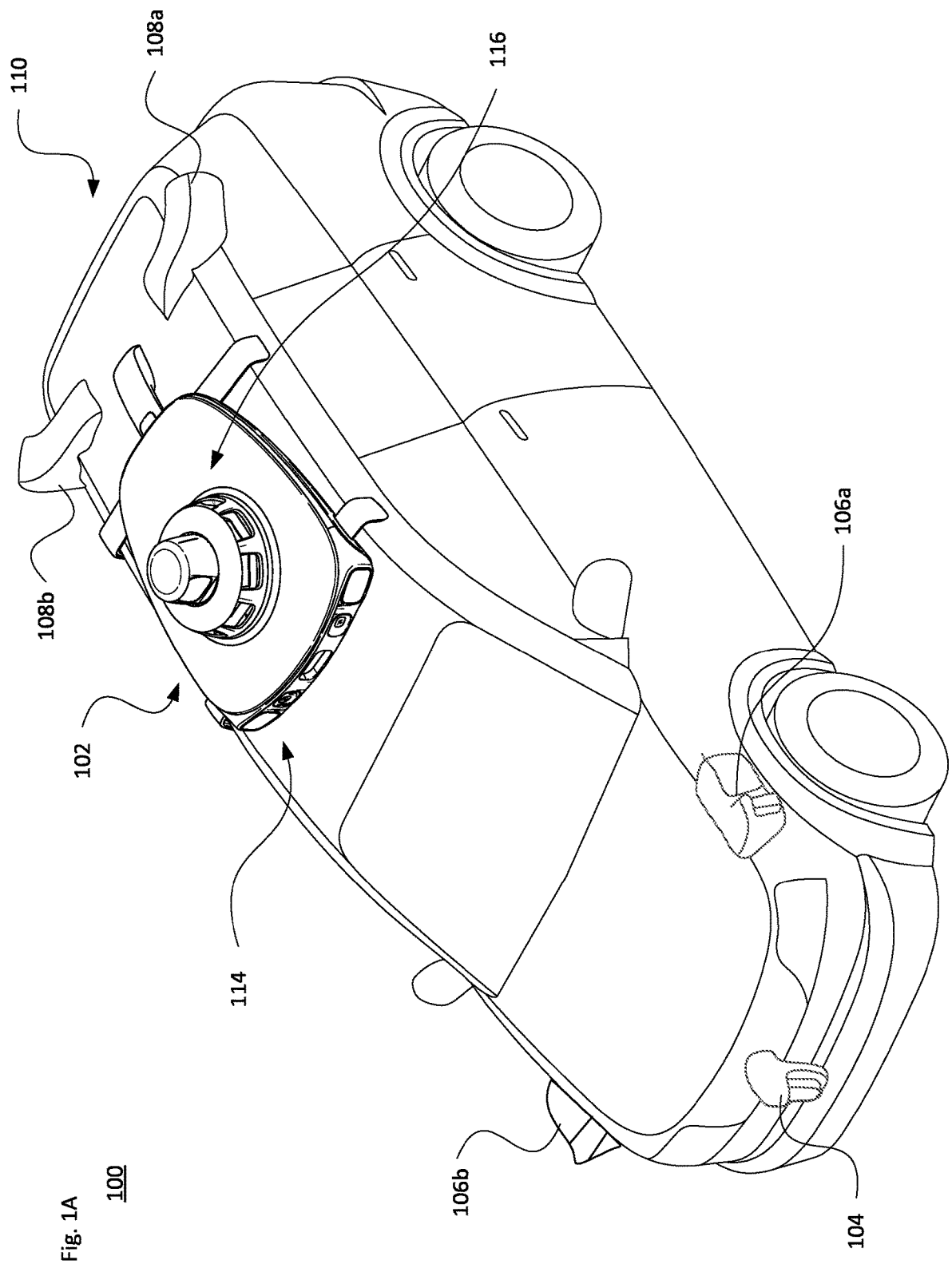
FIGS. 1A-B illustrate example self-driving vehicles in accordance with aspects of the technology.
Figure 1B:
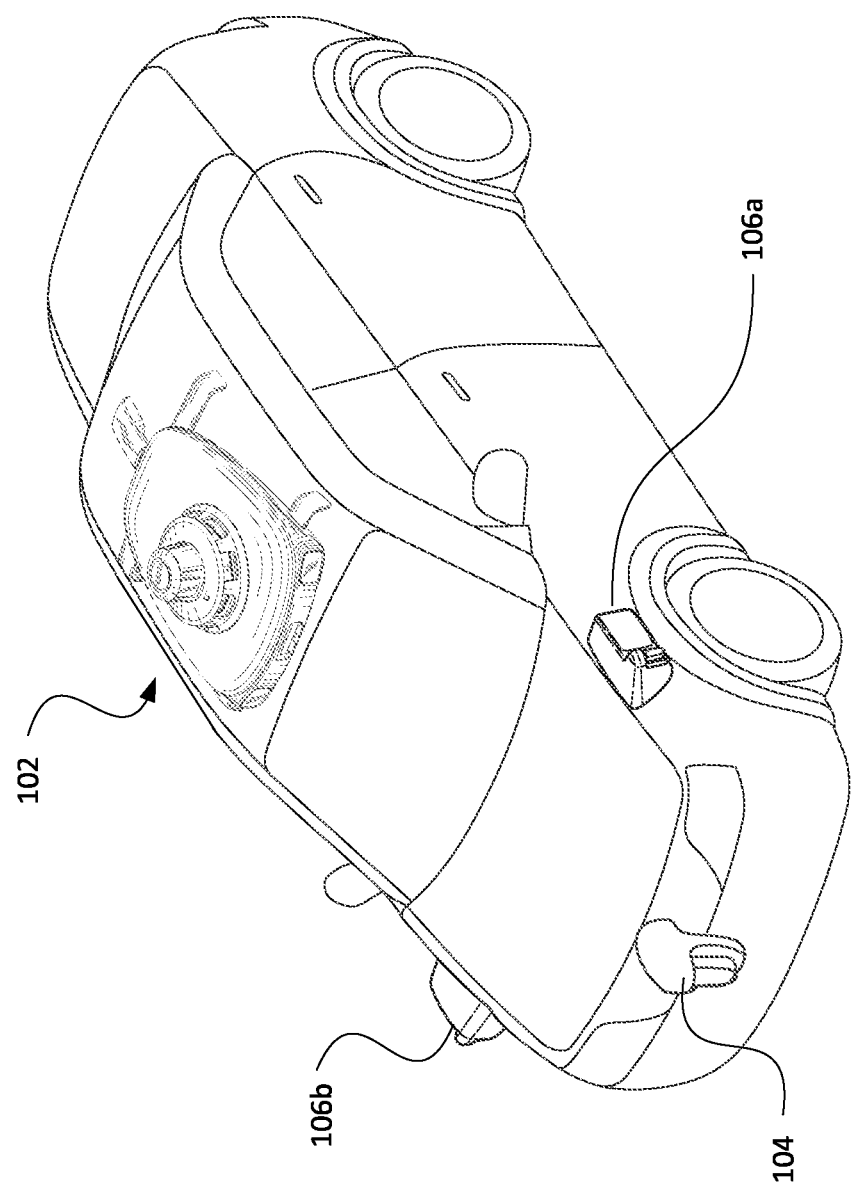

FIG. 1A illustrates a perspective view of an example passenger vehicle 100, such as a minivan or sport utility vehicle (SUV), configured to operate in a self-driving mode. FIG. 1B illustrates a perspective view of another example passenger vehicle 150 that is configured to operate in a self-driving mode, such as a sedan. These passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

Figure 1C:
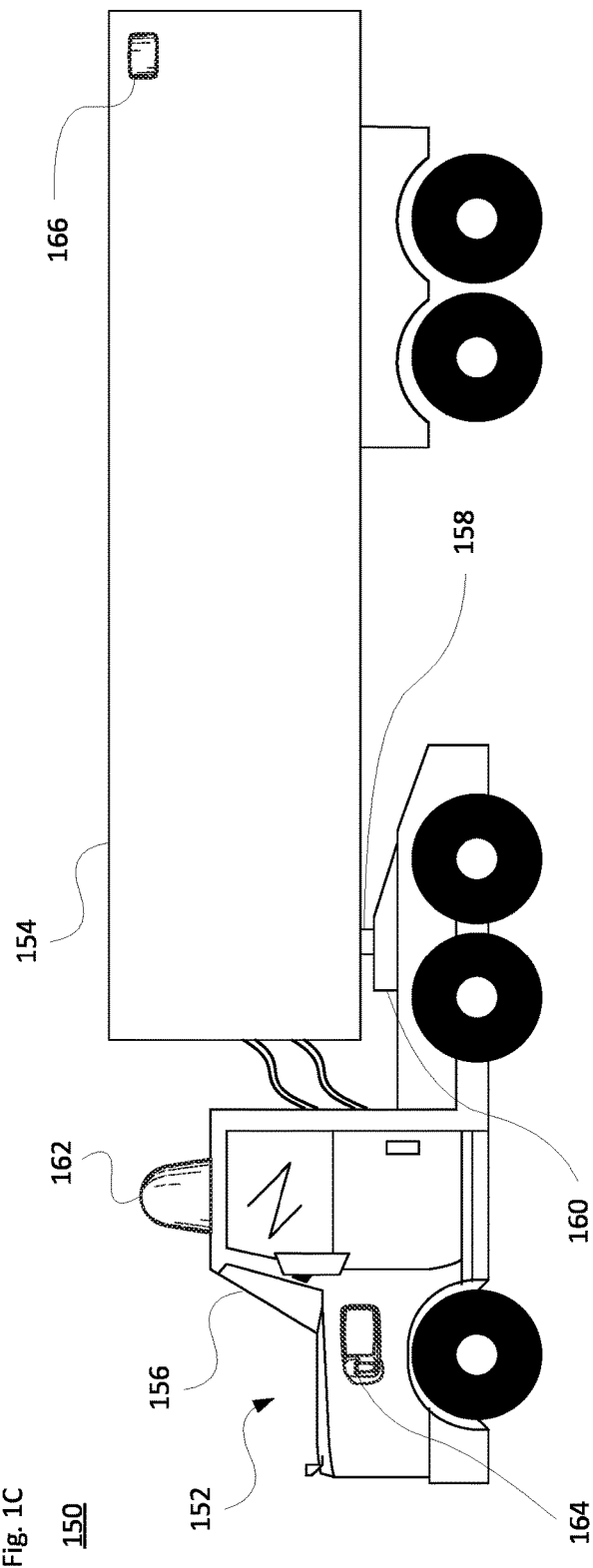
FIGS. 1C-D illustrate an example cargo-type vehicle configured for use with aspects of the technology.
Figure 1D:
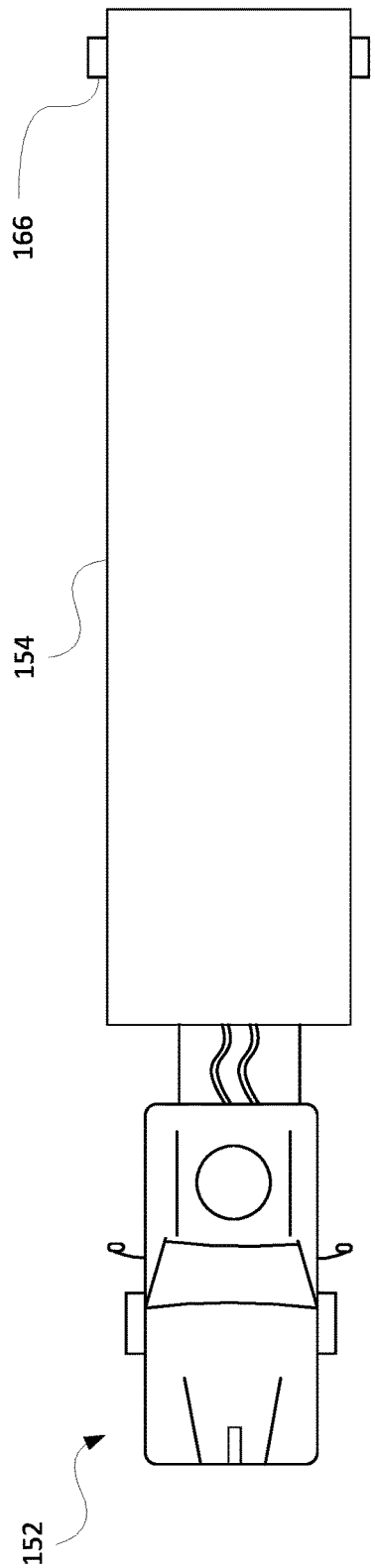

FIGS. 1C-D illustrate an example cargo vehicle 150, such as a tractor-trailer truck, that is configured to operate in a self-driving mode. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
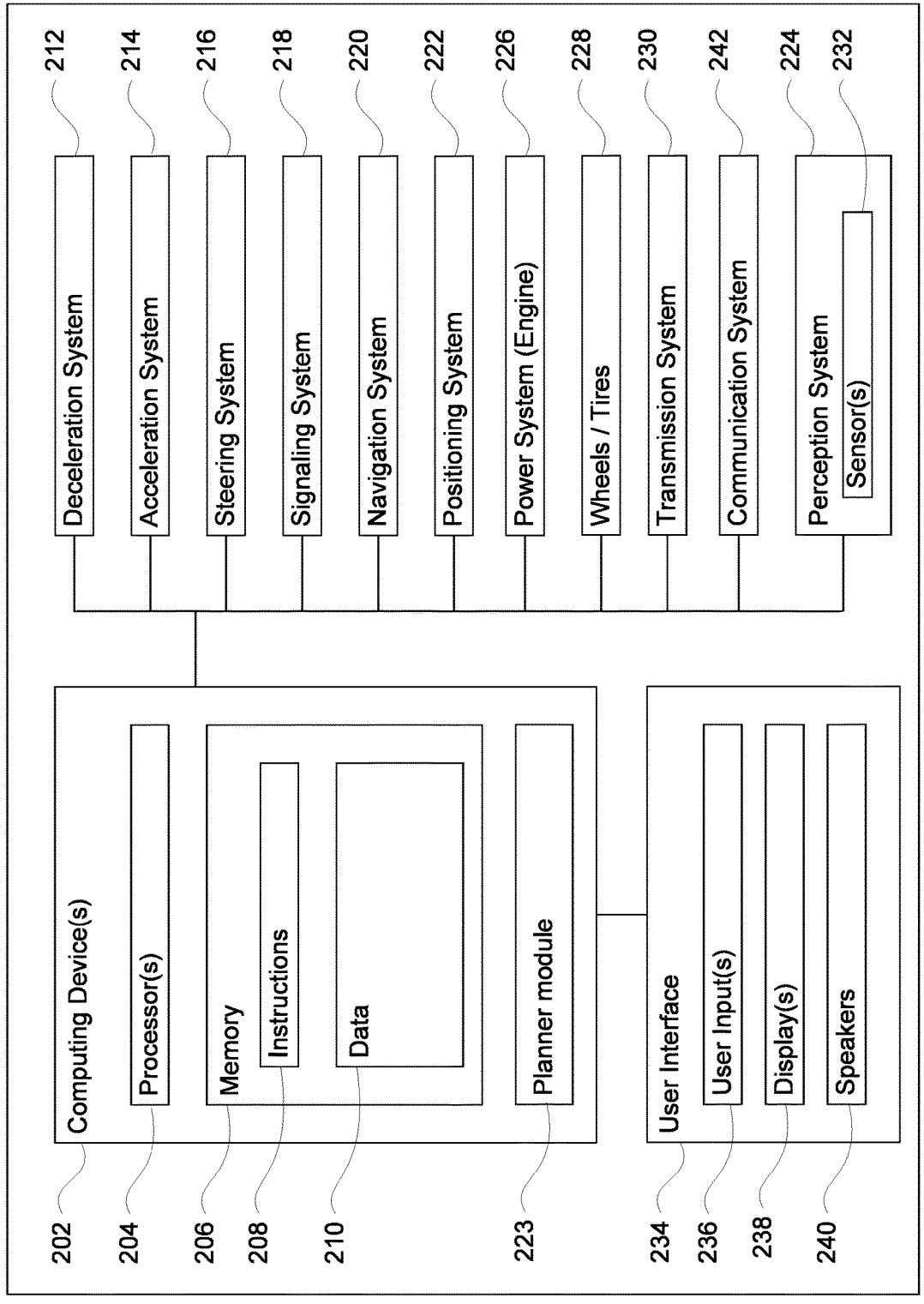
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include illumination-related information to perform, e.g., occluded vehicle detection. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, which may include the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas- or diesel-powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a particular location, such as a destination or intermediate stop or waypoint along a route, completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front and/or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways (e.g., including road inclination/declination, banking or other curvature, etc.), lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings. The microphones may be capable of detecting sounds across a wide frequency band (e.g., 50 Hz-25 KHz) such as to detect various types of noises such as horn honks, tire squeals, brake actuation, etc.

Such sensors of the perception system 224 may detect objects outside of the vehicle and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Information regarding the positioning of passengers, packages or other objects within the vehicle may help determine a center of gravity of the vehicle during a trip. Still further sensors 232 of the perception system 224 may measure the rate of rotation and/or pointing angle of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions, slippery road surfaces and other issues. In addition, the computing devices 202 may perform validation or calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
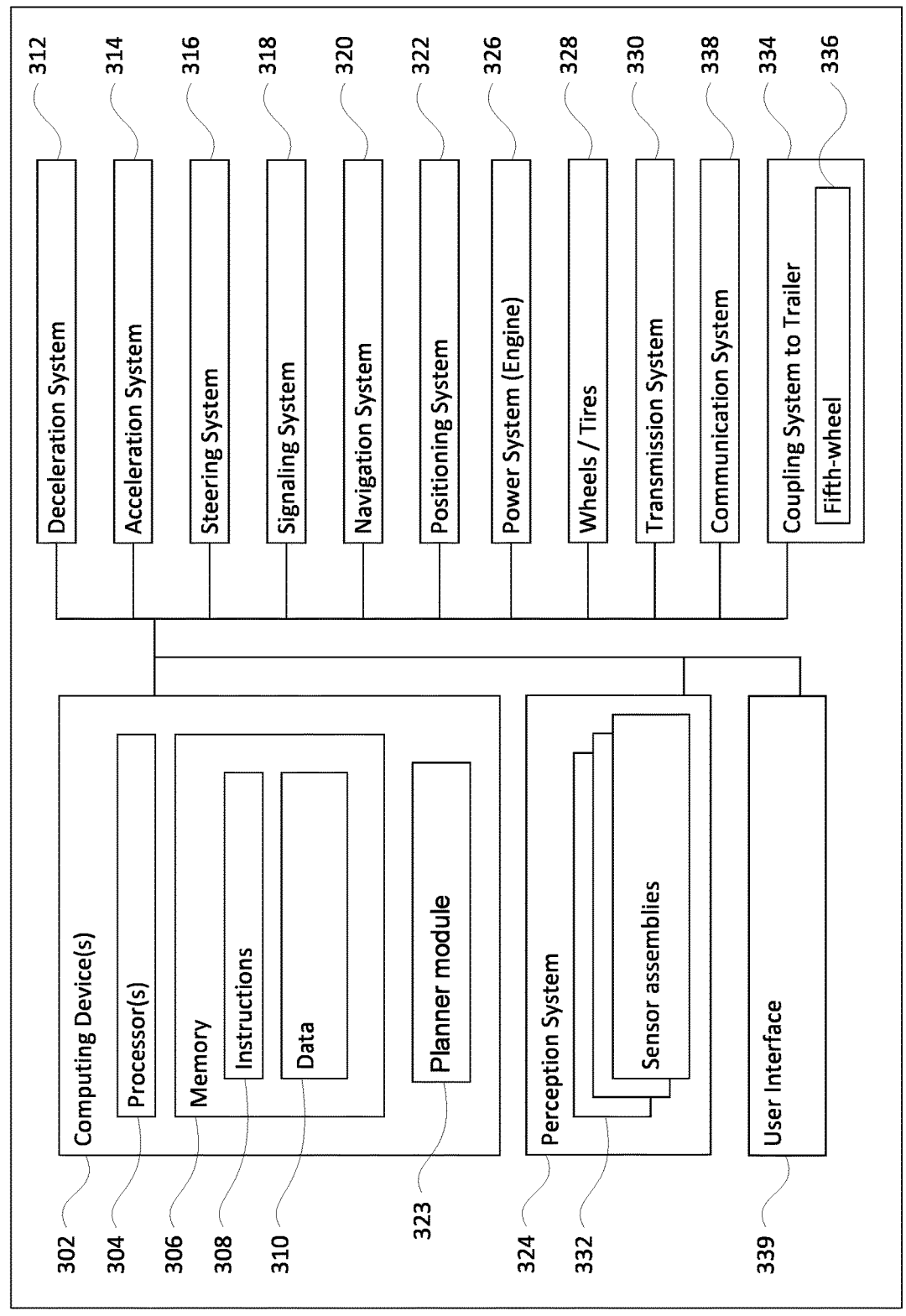
FIGS. 3A-B are block diagrams of systems of an example cargo-type vehicle in accordance with aspects of the technology.

FIG. 3A illustrates a block diagram 300 with various components and systems of a vehicle configured for autonomous driving, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate, wheel angle, wear, and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for planner module 223 FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels 328, deceleration system 312, acceleration system 314, steering system 316, transmission system 330, etc. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
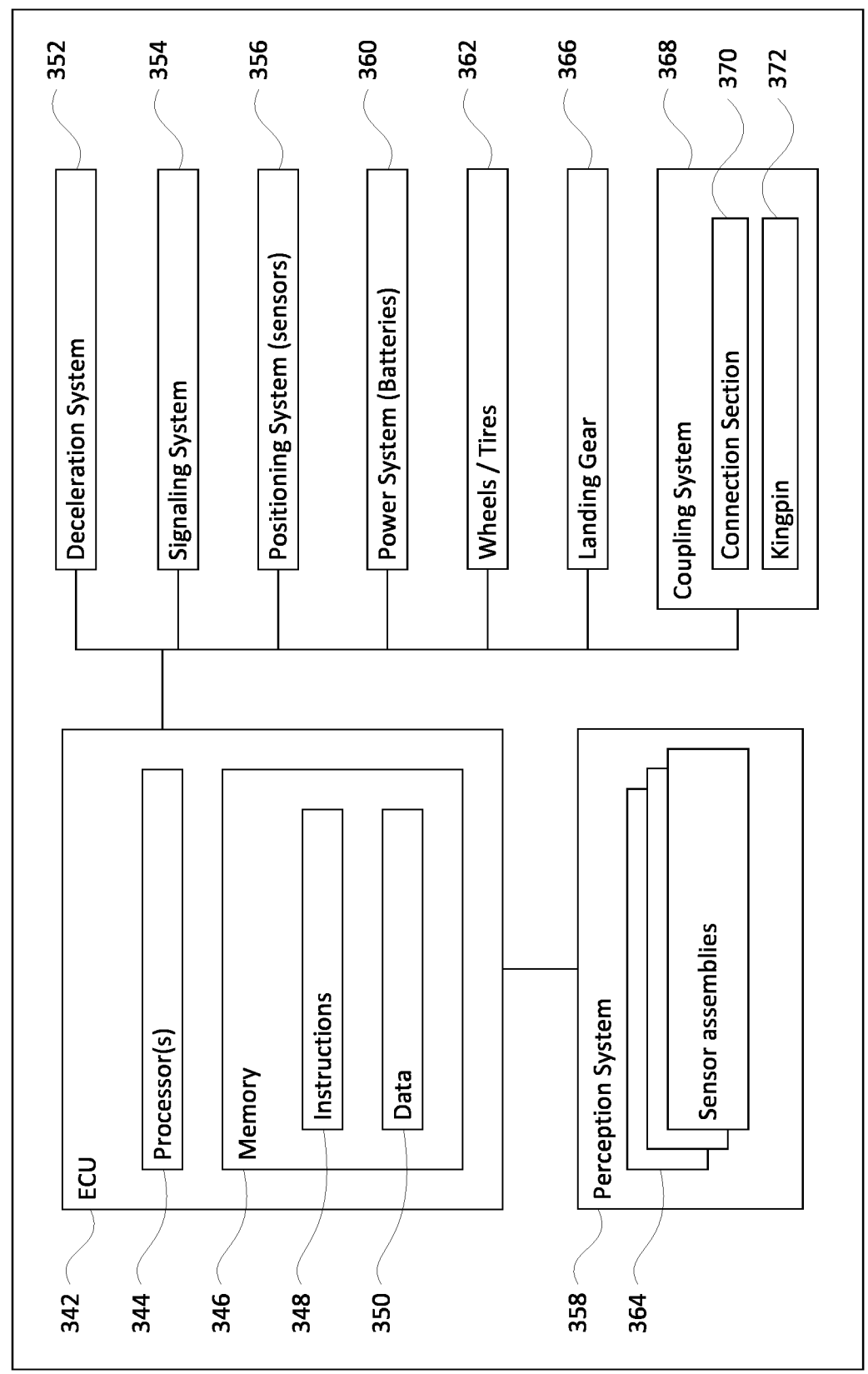

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, rotation rate, wheel angle, wear, and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

EXAMPLES

According to aspects of the technology, while various factors and forces can constrain vehicle handling, a control system evaluates such information and can use it to modify current driving operations or plan an upcoming path or a maneuver. The factors and forces can include the friction interaction of tires on the road surface, actuation forces generated by the vehicle, and external factors. The external factors may include features of the roadway, such as road grade and bank. They may also include environmental factors such as wind gusts, precipitation, temperature, etc.

The vehicle's available control authority is limited by several factors, which can be broadly categorized as intrinsic properties of the vehicle, and extrinsic properties associated with the external environment along which the vehicle is operating. By way of example, the intrinsic properties may include engine torque, braking torque, steering motor torques, vehicle mass, vehicle center of mass, vehicle center of aero-pressure, etc. The intrinsic properties may typically be static or change in discrete and well characterizable increments. For example, a steering failure associated with the vehicle's ECU may cause a step function in available steering motor torque and thus available steering rack force. And the loading of passengers into the vehicle at the outset of a trip may cause a discrete change in the center of gravity and mass of the vehicle. This change may be essentially static for the duration of the trip once passengers are seated.

The extrinsic properties of the environment may include a local gravity vector, surface friction at each wheel along the surface of the roadway, etc. The extrinsic properties can be much more dynamic and, in some cases, be much harder to predict and characterize than the intrinsic properties. It can be helpful to further subdivide the extrinsic properties into two categories: extrinsic forces and extrinsic modifications. By way of example, extrinsic forces can encompass road grade, bank, and wind gusts, while extrinsic modifications can encompass tire force limitations due to changes in surface friction. While road grade (hills) and bank (on/off-ramps, etc.) are very static, predictable and can be readily identifiable using stored map information and/or information obtained by on-board or off-board sensors, forces such as wind pressure or reductions in surface friction due to rain, oil, snow, or ice may be very dynamic both in the spatial and temporal domains.

The forces associated with such intrinsic and extrinsic factors can be considered in three-dimensional space. According to one aspect of the technology, to maintain proper control authority of the vehicle, the sum of the intrinsic ($F_{intrinsic}$) and extrinsic ($F_{extrinsic}$) forces projected into the longitudinal and lateral directions relative to the vehicle should not exceed the tire force available from friction ($F_{\mu s}$) in the same direction, according to the following equation:

$$\overrightarrow{F_{intrinsic}} + \overrightarrow{F_{extrinsic}} \leq \overrightarrow{F_{\mu_s}} \quad \text{(Eq. 1)}$$

However, given that the magnitude of the mass of the vehicle is relatively static during maneuvering, this equation may be reduced to focusing on the accelerations as follows:

$$m\overrightarrow{a_{intrinsic}} + m\overrightarrow{a_{extrinsic}} \leq m\overrightarrow{a_\mu} \quad \text{(Eq. 2)}$$

$$\overrightarrow{a_{intrinsic}} + \overrightarrow{a_{extrinsic}} \leq \overrightarrow{a_\mu} \quad \text{(Eq. 3)}$$

In other words, the system may consider the ranges of accelerations that the vehicle can produce and add the range of external disturbance accelerations. In order for control to be maintained without sliding on the road surface, the sum of these accelerations must be less than the limiting acceleration due to friction. This information can be used to identify an envelope of feasible accelerations based on envelopes of friction-limited acceleration and actuator-limited acceleration, as shown in the exemplary plot 400 of FIG. 4. In particular, plot 400 shows in the dashed line 402 an envelope of friction-limited acceleration, and shows in the dash-dot line 404 an envelope of actuator-limited acceleration. The solid line 406 represents the envelope of feasible accelerations in the lateral ($A_y$) and longitudinal ($A_x$) directions relative to the pose of the vehicle, which is constrained by the envelopes 402 and 404.

Given this, feasible and stable acceleration may be achieved in various vehicle/environment states if the on-board computing system (e.g., planner module) is able to create routes, paths, short-term corrections or other operating plans that take into account modified lateral and longitudinal acceleration limits (and acceleration rates), which are dynamic in time and space.

Figure 5:
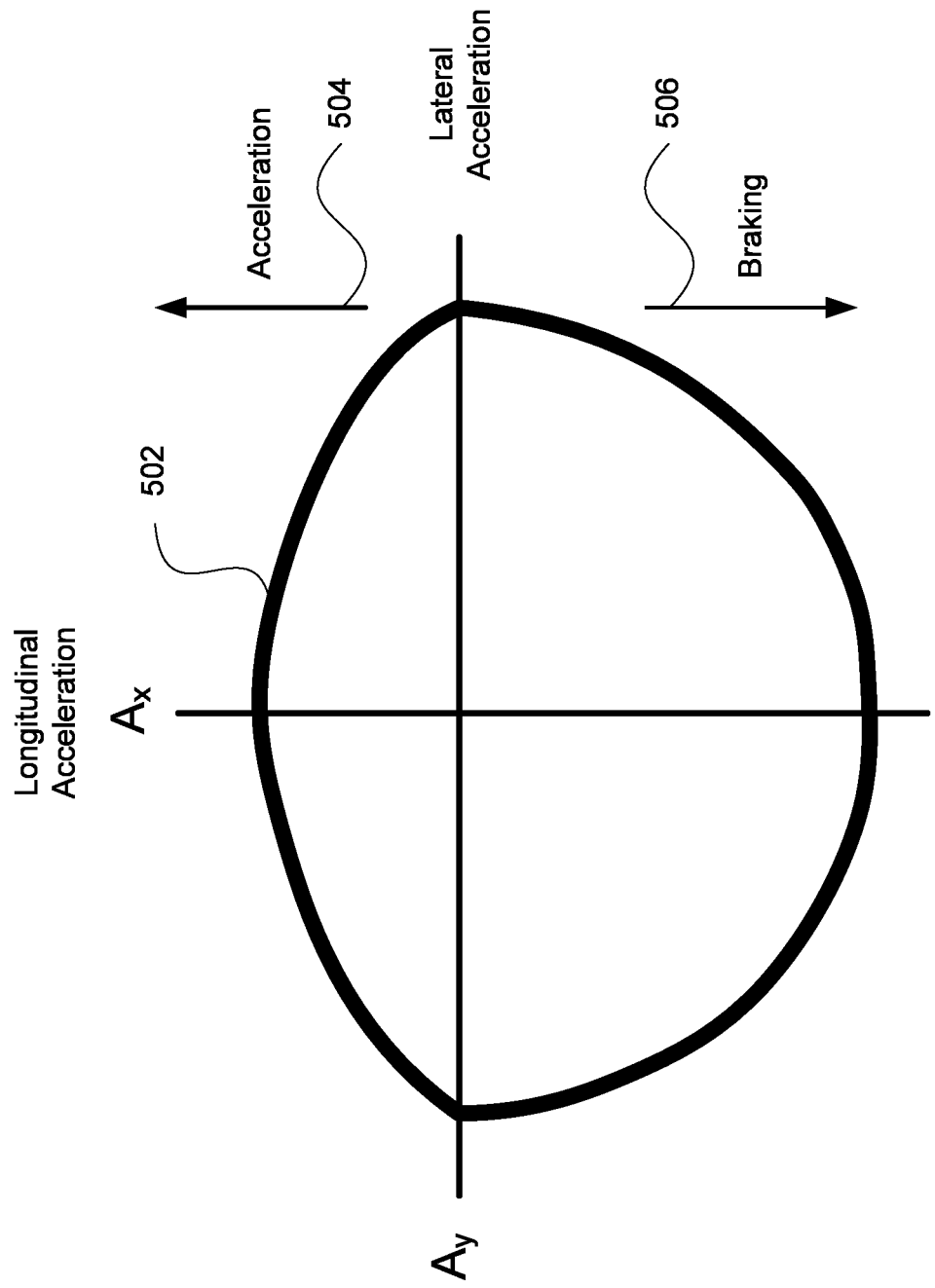
FIG. 5 illustrates an example envelope of maximum acceleration in accordance with aspects of the technology.

One way to achieve this is via an approach that evaluates an available acceleration model. In one example, the model may be derived from a "G-G" graphical diagram, which defines an envelope of maximum acceleration in longitudinal and lateral acceleration space ($A_x$, $A_y$), which reflects the combined influence of various limitations such as discussed above, e.g., relating to actuator performance, friction, road bank, road grade, etc. FIG. 5 illustrates an exemplary G-G diagram 500. As seen in this example, envelope 502 is not symmetric about the longitudinal ($A_y$) axis, owing to the fact that positive longitudinal acceleration (shown by arrow 504) in this example is actuator (e.g., propulsion) limited, whereas negative longitudinal acceleration (braking, shown by arrow 506) is friction limited. Any implementation of this envelope would accommodate this asymmetry.

The characteristics of the acceleration envelope may vary in several ways in response to the contributing factors described herein. For instance, when there is a change in friction, the entire envelope 502 will shrink. In the case of an idealized circular envelope, this would correspond to a decrease in radius of the envelope. For a change in road grade, the entire envelope will shift vertically along the $A_x$ axis due to rotation of gravity in the vehicle frame. Here, the envelope will likely also distort vertically as a result of longitudinal load transfer. For a change in road bank, the entire envelope will shift horizontally along the $A_y$ axis due to rotation of gravity in the vehicle frame. Here, the envelope will likely also distort horizontally as a result of lateral load transfer. And for a change in actuator capability, this may manifest as either longitudinal or lateral distortions in the envelope. By way of example, a change in actuator capability may include (a) dual wound electric motors losing one part of the winding, (b) reduced brake pressure built-up (rate) due to increased fluid viscosity in low temperatures, (c) brakes limited to one hydraulic circuit (e.g., diagonal or front/rear split) due to a hydraulic leak, (d) reduced motor performance in brakes or steering due to voltage input drop, (e) motors thermal derating, etc. Therefore, the implementation of the envelope according to aspects of the technology supports shifting, scaling, and distortion as needed.

In order to avoid a loss of traction event, according to one aspect the trajectory analysis accounts for the available friction and limits forces/accelerations to be less than the available friction force. This includes evaluating both the tire state and the friction between the tires and the road surface.

The state of the tires can be estimated to understand how the tires will interact with the driving surface in order to create the friction envelope. Tire state estimation is used to capture one or more of the tire slip angle, tire longitudinal and/or lateral slip, tire normal force, the contact patch size and location, the tire deformation, tire material temperature, and any other parameter intrinsic to the vehicle's tire that would change the ability of the tire to stick to the road surface. According to one aspect of the technology, tire estimation may be performed per tire (including, e.g., longitudinal and lateral slip, etc.). There may be one friction coefficient estimate for all tires, but there can be situations identified as mu split (different left right braking surfaces). Tire temperature could be evaluated generally on the vehicle level, but could also be evaluated on a per-tire basis. For large vehicles such as cargo trucks, there may be 2 or more steering tires, 8 or more drive tires for the tractor, and 8 or more trailer tires. These different sets of tires could be evaluated as separate groups or on an individual basis. Note that the amount of tire wear can influence both force build-up as-well-as effective rolling radius (which is relevant to the longitudinal slip estimation).

The properties of tire-road surface interaction are estimated to model the force limits of the vehicle's tires, e.g., using a parametric model of the tires. This factor captures the extrinsic property of the driving surface that determines (when combined with the tire's state) the envelope of available friction. By way of example, the driving surface may be asphalt, concrete, gravel, paving stone, brick or other type of pavement. The driving surface may change depending on whether the road segment is a surface street, highway, bridge, etc. It may also change due to construction, such as when a steel plate covers a stretch of roadway or asphalt is used to patch areas of a concrete surface. Estimation of tire-road surface interaction could be as complex as an on-line friction estimation or as simple as a parameter adjusted by offboard weather monitoring. A lookup table could be used for different road surfaces and/or weather conditions. Offline characterized tire parameters can be used for different friction coefficients. By estimating the tire's lateral and longitudinal forces and their estimated tire slip state, one could back estimate the friction coefficient of the tire. Alternatively or additionally, online friction estimation methodologies may also be employed. This can include estimation by tire force and slip angle estimation and fitting a tire curve online, estimation by detecting a reduction in pneumatic trail via steering torque measurements, and/or acoustic methodologies that use accelerometers embedded in the tires.

As noted above, according to another aspect of the technology the trajectory analysis also evaluates external forces on the vehicle. The external forces on the vehicle are estimated because they will contribute to the total force on the vehicle, which needs to stay below a friction threshold in order for traction to be maintained on the roadway. This evaluation can include both local gravity vector estimation and random or variable external force estimation (environmental force estimation).

The local gravity vector estimate is a measure of the local bank and grade of the roadway, which affects the total available acceleration. The local gravity vector will also cause body pitch, body roll, load transfer between tires, and torque moments depending on orientation with respect to the vehicle heading. Detailed maps may be used that contain information for road grade and banking. Fusing this information with a state estimator (such as a Kalman filter) that utilizes inertial measurement sensors (e.g., accelerometers and gyroscopes) together with speed information such as from a Global Navigation Satellite System (e.g., GPA) and the wheel speed sensing can be employed to identify which part of the acceleration is due to road grade and/or banking, and which due to vehicle motion control.

The environmental or random/variable external force estimation captures a sense of the expected random disturbance forces (e.g., wind, rough road surfaces). Initially this is likely implicitly assumed to be limited by the operational design domain; however, for scaled deployment with optimal motion control performance, external disturbances could be modelled and taken into account (e.g., using a wind gauge to estimate the side forces on trailer due to wind). The operational design domain may encompass the area(s) in which vehicles are deployed (e.g., which part of a city), the time of day (or season), the traffic conditions, the weather conditions, etc. By way of example, driving at 6:00 pm in a city such as San Francisco or New York City in the middle of a snowy winter may be more challenging than driving at 2:00 am during the summertime in Miami or Phoenix. A sense of mean and variance in random external forces could be used to either inform maneuvers that are likely to be executed with little error, or the estimation information could be passed to the planner module to inform lateral gap evaluation with regard to object planning, such as how close the vehicle can drive with regard to a parked car or other roadway object. By way of example, if data indicates that there are disturbances that will cause poor position control performance (e.g., beyond some threshold value), then according to one aspect the planner would keep greater gaps to objects due to the uncertainty of the position error that can be achieved. Statistically, this can be understood by the mean and standard deviation of the position error as a function of various conditions. Thus, in one dry condition scenario the planner could always be controlling the vehicle's lateral position within 10 cm for 99.999% of the time. Under the assumption that there always will be an agent-object adjacent to the vehicle, if a minimum lateral gap of 10 cm is maintained, then the likelihood of a collision would be 0.001%. Another option is Monte Carlo simulation of disturbances (e.g., with some assumption on what the distribution of disturbances should look like) using a dynamic model of sufficient fidelity to set planner lateral gaps under different conditions.

A further aspect of the technology estimates the internal force capability on the vehicle. In particular, the available internal force generating capability of the vehicle should be understood in order to ensure that the vehicle is capable of achieving the desired accelerations, even if they are allowed by the extrinsic factors. This can include one or more of the following estimations: steering system state, braking system state, propulsion system state and vehicle properties state.

The steering system state estimation can be used to capture any information that affects the ability of the steering subsystem to apply force/acceleration to the vehicle. This can include information such as rack motor power limitations, rack inertia, the number of active electronic control units or other control modules, motor torque response functions, control mode, internal limiters, etc. Braking system state estimation may capture any information that affects the ability of the braking subsystem to apply force/acceleration to the vehicle. This can include information such as pump motor power limitations, stability intervention events, the number of active electronic control units or other control modules, hydraulic pressure state, the amount of regenerative braking available, control mode, internal limiters, etc. Propulsion system state estimation may capture any information that affects the ability of the powertrain subsystem to apply force/acceleration to the vehicle. This can include information such as motor power limitations, motor torque response functions, hysteretic effects, fault condition, control mode, internal limiters, etc. And vehicle (kinetic) properties state estimation may capture information such as the mass properties of the vehicle and encode the current state of motion. Fluid level reservoirs, current sensors, encoders to measure position and estimate speed and acceleration may all be employed. Many abnormalities can be diagnosed using models. For instance, for a specific displacement of a hydraulic piston, there would be an expectation for a certain amount of pressure to build up. If the pressure is not building up with the expected rate, this would be indicative of a leak.

Figure 6:
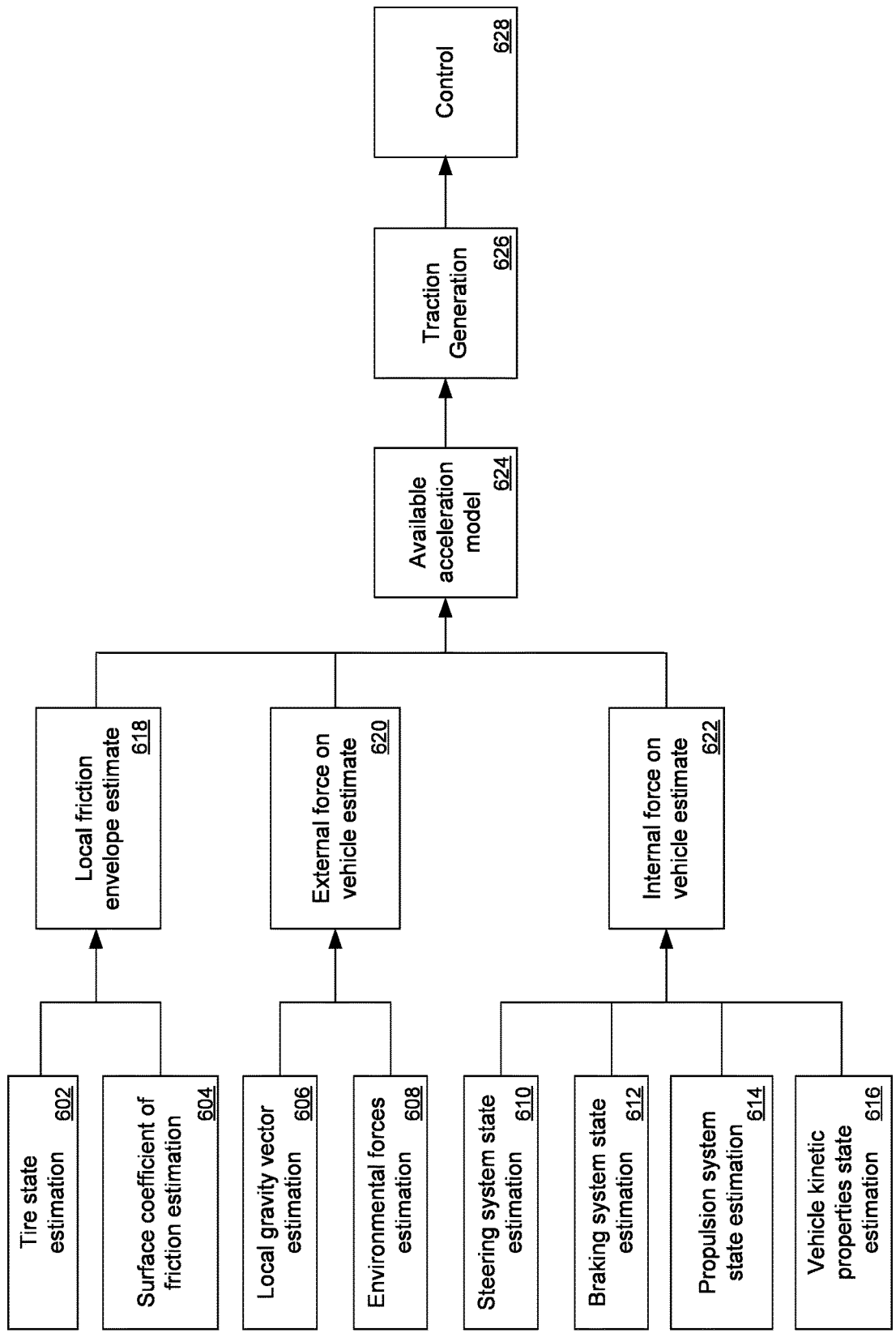
FIG. 6 illustrates an example functional architecture in accordance with aspects of the technology.

FIG. 6 illustrates a functional architecture 600 that evaluates the intrinsic and extrinsic information described above to generate an available acceleration model. The estimations and evaluations may be done by the on-board processing system (e.g., 202 of FIG. 2 or 302 of FIG. 3A), for instance using various estimation modules. In particular, tire state estimation is performed at block 602 and surface coefficient of friction estimation is performed at block 604. Local gravity vector estimation (in accordance with forces associated with road banking and grade) is performed at block 606 while environmental forces estimation (e.g., random/variable external force estimation due to wind disturbance or rumble) is performed at block 608. Note that these factors would change the shape of the envelope for friction-limited acceleration (dashed line 402 in FIG. 4). For instance, going uphill, the whole ellipse in plot 400 of FIG. 4 would shift toward the bottom. Steering system state estimation is performed at block 610, braking system state estimation is performed at block 612, propulsion system state estimation is performed at block 614 and vehicle kinetic properties state estimation is performed at block 616. While such estimations are shown as being performed in discrete blocks, they may also be done collectively via one or more modules. In one scenario, if the propulsion from the acceleration system can only deliver 3 m/s$^2$ longitudinal acceleration, that sets a cap to the vehicle's acceleration. If the brakes of the deceleration system can deliver up to −10 m/s$^2$ then that would set a threshold for longitudinal acceleration (deceleration). And if the steering system can only steer up to 5 m/s$^2$ due to a system software limitation or a fault, then that would set a limit on the lateral acceleration. Thus, how different actuators (e.g., acceleration system, deceleration system, steering system) operate have an impact on the overall vehicle performance. It is also useful to consider the rates that the actuators can develop the forces, shown in a steady-state example in the g-g diagram. For efficient planning, the planner module should also be aware of the rate that the vehicle can move within the g-g diagram.

As shown in this architecture, information from the tire state estimation block 602 and the surface coefficient of friction estimation block 604 are analyzed in local friction envelope estimate block 618. For instance, the local friction envelope estimate module consumes information from blocks 602 to 604 to decide how the performance limits due to friction should be adjusted. This corresponds to a scaling of the g-g diagram for the vehicle in g-g diagram 500. By way of example, using the tire state estimation, longitudinal and lateral slip and an adaptive value for the friction coefficient, the vehicle level friction envelope can be derived. Here, the system may also consider scenarios in which the wheels have different friction coefficients (e.g., split mu scenarios). The information from the local gravity vector estimation block 606 and the environmental forces estimation block 608 are analyzed at the external force on vehicle estimate block 620. In particular, this block consumes information from the local gravity vector estimation and the environmental forces estimation in order to decide how the performance limits due to external forces should be adjusted. The first order effect of this is a shifting of the g-g diagram for the vehicle (though there may be some distortion as a second order effect). And the intrinsic vehicle-related information from blocks 610-616 are evaluated by internal force on vehicle estimate block 622. This block consumes information from its inputs to decide how performance limits due to actuator limitations should be adjusted. For example, if the brake force actuation should become limited (e.g., due to a hydraulic leak), then the bottom of the g-g diagram will be distorted (the lower extreme will move upward). The influence of external disturbances can have a noticeable influence on the estimate. Thus, according to one aspect the system should have knowledge on the magnitude of the disturbances to see how the g-g plot may be affected. For instance, this could be done conservatively, e.g., by identifying that the maximum state acceleration disturbance due to wind or potholes is 1 m/s$^2$ and reduce the overall size of the g-g diagram accordingly.

The results from the estimations at blocks 618, 620 and 622 are incorporated together at block 624 to generate an available acceleration model. Based on this, the on-board planner module or other portion of the processing system can produce a traction generation profile (e.g., a variable motion control envelope) at block 626. This profile can be updated continuously, periodically (e.g., every 0.1-2.0 seconds, or more or less), between iterations of the path generated by the planner, or upon the occurrence of an action, event or other condition that may impact the motion control envelope. In addition to being updated temporally, the profile can also be updated spatially. For instance, if a portion of the planned trajectory is on a dry road segment and a portion is on a wet road segment, trajectory waypoints on the wet section could have a reduced friction coefficient and consequently a shrunken g-g diagram. The output from block 626 can then be used by the control system of the vehicle at block 628 to change driving actions or update an operating plan for an upcoming portion of the trip along a selected portion of the roadway. This could include modifying a braking or accelerating operation, altering the planned path of the vehicle, or taking another course of action.

Figure 7A:
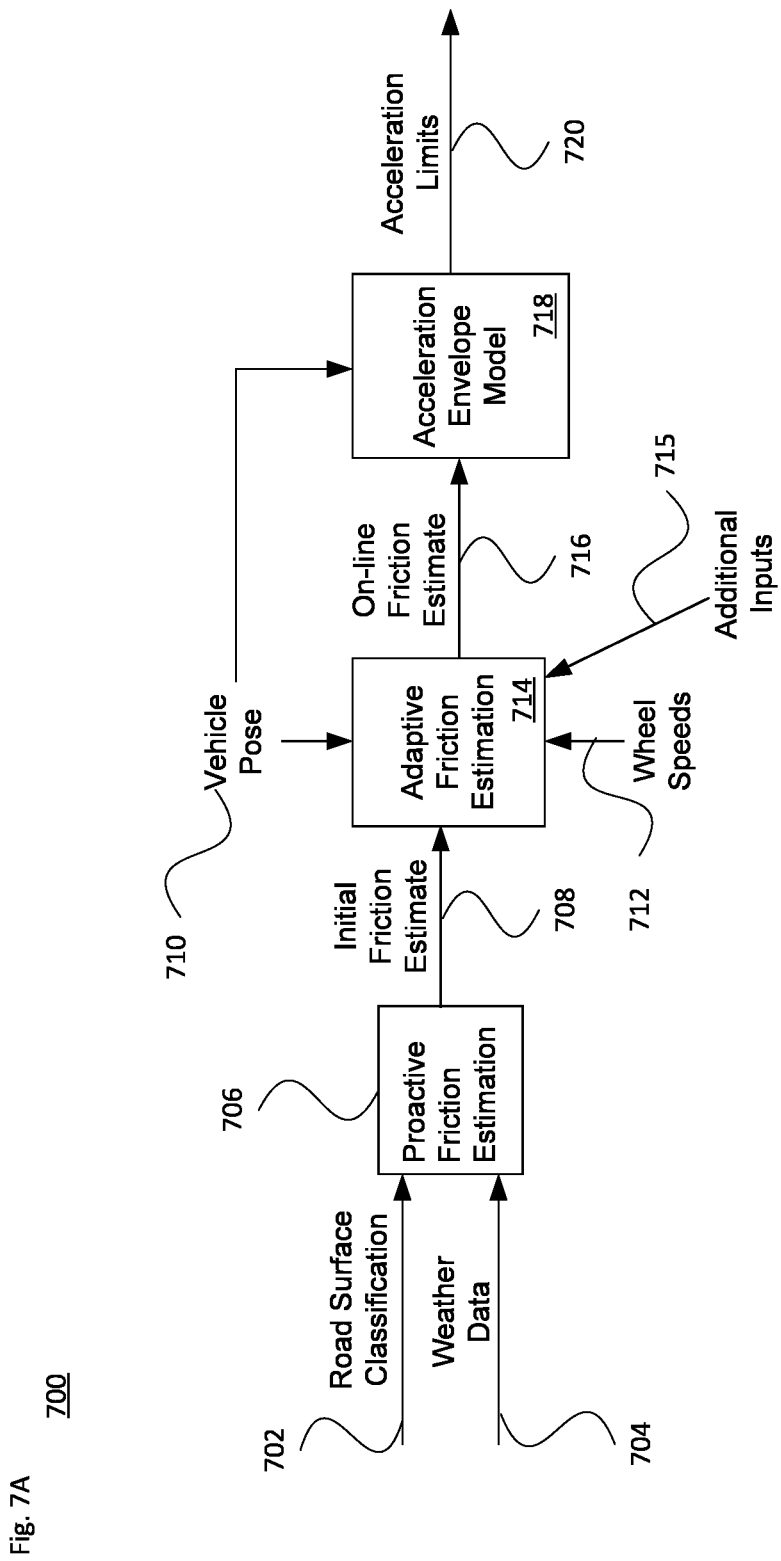
FIGS. 7A-B illustrates an example implementation architecture in accordance with aspects of the technology.
Figure 7B:
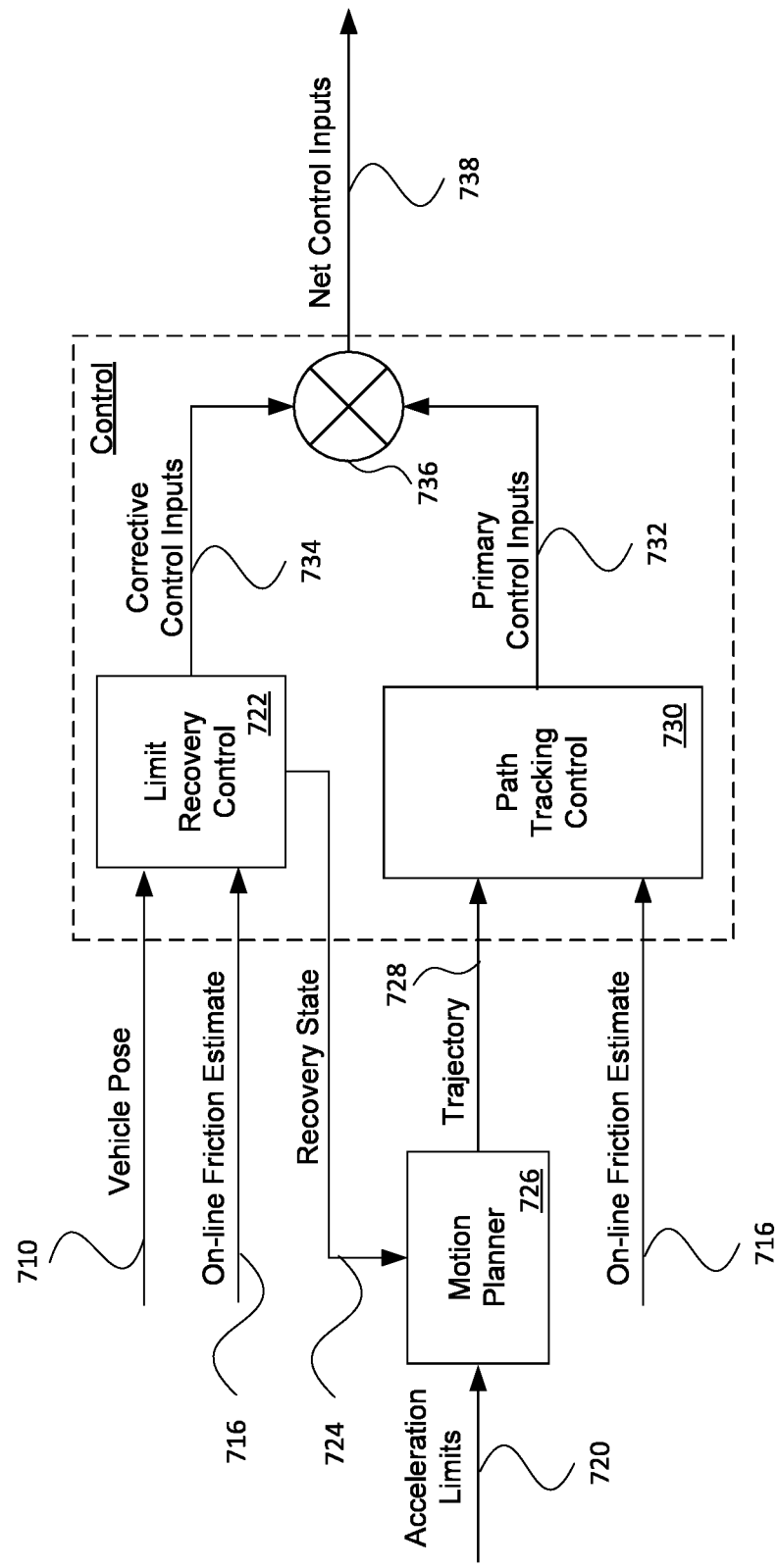

FIGS. 7A-B illustrate an example architecture 700 that implements a selected subset of the functional architecture discussed above in order to produce a traction generation profile and use that information for vehicle control in an autonomous driving mode. In the example architecture 700, surface friction estimation acts as a primary input to an available acceleration model, in particular an acceleration envelope model. The acceleration envelope model then provides dynamically varying acceleration limits, e.g., to a planner module of the processing system, which uses this information to generate a trajectory used when controlling the vehicle.

In this example, road service classification information 702 and weather data 704 are inputs to a proactive friction estimation block 706. Output from block 706 is an initial friction estimate 708. For instance, if the system knows that it is raining or snowing in an area based on weather data 704, it can set the friction bounds accordingly to be lower, e.g., for a dry road surface the friction bounds may be between [0.9 to 1], while for a wet road surface it may be on the order of [0.6 to 0.9] and for snow from [0.2 to 0.4] depending on the tires. In addition, the road surface classification (702) may be weighted more heavily than the weather data (704), as the road surface classification would represent the most localized indication that impacts the proactive friction estimation (706). For instance, the weighting may be in ratios of, e.g., 60:40, 70:30 or 80:20 (or more or less) based on the type of classification and/or the type of precipitation.

The initial friction estimate 708 and other information, in particular vehicle pose 710 and wheel speeds 712, are input into block 714 for adaptive friction estimation. The wheel speeds 712 may be a subset of the tire state estimation information from block 602 of FIG. 6. In one scenario, there may be additional inputs 715 to the adaptive friction estimation 714, such as actuation forces and tire normal force estimation. This information may indicate how much braking/propulsion torque the vehicle is putting into the tires. For instance, it can be helpful to know what is "asked" from the tires vs what the tires deliver to be able to estimate their potentials. The normal load is fundamental to understand how much vertical force is exerted.

The adaptive friction estimation block 714 utilizes this input information to generate an on-line friction estimate 716 during real-time driving.

Block 718 uses both the vehicle pose 710 and the on-line friction estimate 716 in an acceleration envelope model, such as available acceleration model 624 of FIG. 6. The output of block 718 is a set of acceleration limits 720, which effectively scales the g-g diagram in response to changes in friction. Thus, block 718 can conceptually be viewed as encompassing the functional architecture 600 prior to control of the vehicle.

As shown in FIG. 7B, the on-line friction estimate 716 and the vehicle pose 710 information are input into limit recovery control block 722, which generates recovery state information 724. According to one scenario, limit recovery control 722 is tasked with augmenting the inputs generated by path tracking control of the control block (e.g., block 628 in FIG. 6) if the vehicle is approaching or has reached the friction limits. This can occur when the tire-road friction coefficient is lower than predicted, such as might happen if the vehicle travels over a patch of reflective paint on a wet roadway. The purpose of these augmented inputs will be to direct the vehicle state back to a regime that is away from the handling limits. However, in some situations it may be the case that the limit recovery objective conflicts with the path tracking objective. Here, it may be necessary to temporarily induce larger positional errors for the sake of maintaining stable vehicle behavior by avoiding the handling limits. For this reason, limit recovery control block 722 would provide status in the form of recovery state information 724 (e.g., NOT_ACTIVE, ACTIVE) to the motion planner block 726 (e.g., of the planner module) for the purpose of adapting planner behavior in this scenario.

Another way to approach this is to imagine that a path is being tracked. Due to a limit handling situation such as hitting a patch of ice, the vehicle will deviate from its intended path. The limit recovery controller 722 can momentarily disregard the path being tracked and will try to get the vehicle stable, which could be done by understeering. The recovery control could try to reduce the speed to and potentially decrease the steering angle to go back into a stable trajectory, which could be fed back to the planner. Thus, the recovery state can be viewed as a target trajectory that will stabilize the vehicle. The planner can then accordingly replan from the current vehicle state and the same time could decrease the vehicle motion envelope (see FIG. 4) due to uncertainty of the traction limits Therefore, in one example, for block 722 the inputs would include vehicle pose, the on-line friction estimate, as-well-as the actual trajectory of the vehicle.

The limit recovery control block 722 can also be viewed as simultaneously providing inputs to bring the vehicle back within a certain state envelope (via corrective control inputs 734) while also feeding back an indication that traction loss has occurred (recovery state 724), either through a binary flag or updated/reduced limits. The distinction here is that limit recovery control is not responsible for generating/proposing a new trajectory, but maintaining vehicle stability while signaling that a change in planned trajectory is required. Thus, in this scenario the actual trajectory would not be necessary as an input to block 722.

The set of acceleration limits 720 and the recovery state information 724 are input to motion planner block 726, and a trajectory 728 is output to path tracking control block 730 of the control section. In one example, inputs to the motion planner 726 (the acceleration limits 720) correspond to the acceleration information from FIG. 5, e.g., the actuator rate limits (in other words the speed the vehicle can move within the trace of the G-G diagram), a route (e.g., where the vehicle is driving), and a set of path constraints (e.g., what is the path occlusion due to obstacles). Thus, in this situation, the primary control inputs would be feedforward (e.g., how much torque is needed to maintain steady state speed over this grade, what are the vehicle's aerodynamic losses, what is the vehicle's rolling resistance, etc.) and feedback commands (e.g., how much path tracking error is there) of a path tracking controller. As shown, path tracking control block 730 also receives the on-line friction estimate 716. In one scenario, the path tracking control 730 additionally receives instantaneous accelerations limits. Here, for instance, if the vehicle is on a grade or a road bank, that information can help to generate the correct feedforward command for the path tracking control 730.

Output from the path tracking control block 730 is a set of primary control inputs 732. A set of corrective control inputs 734 is output by the limit recovery control block 722 (in addition to the recovery state information 724). The primary and corrective control inputs are mixed together at 736, with a resultant set of net control inputs 738 being the result. The net control inputs 738 are then used by the processing system to control operation of the vehicle in the autonomous driving mode.

Note that the components of the example architecture may be characterized as being either proactive, adaptive, or reactive in character. For instance, proactive components output an anticipated friction coefficient (e.g., initial friction estimate 708 from block 706) based on prior/offboard analysis of multiple sources of contextual information such as the road surface classification 702 and weather data 704. Adaptive components such as block 714 refine the vehicle's current notion of friction based upon real-time estimation techniques that estimate the true friction coefficient prior to the vehicle encountering the friction limits, for instance by using the vehicle's pose information 710 and wheel speeds 712 in conjunction with the initial friction estimate 708.

Reactive components such as limit recovery control block 722 respond to a degradation in motion control performance when the vehicle unexpectedly encounters its friction limits. These components are tasked with both maintaining acceptable (but temporarily relaxed) position error bounds and providing feedback to the planner module as needed.

A robust implementation of a variable motion control envelope may include all three component types, through proactive friction estimation. For instance, in one scenario proactive friction estimation utilizes a combination of perception and weather data to estimate the extent and severity of road wetness, which is in turn used to predict the road-tire friction coefficient in a data-driven fashion based on prior analysis. Adaptive friction estimation utilizes motion sensing, models of the tires and vehicle dynamics in on-line real-time estimation to estimate a tire-road friction coefficient. A guiding principle of these estimation techniques is that it is possible to estimate tire-road friction at the onset of nonlinearity in the tire's force-slip curve, but prior to the tire reaching its friction limits.

Friction estimation using such wheel slip-based techniques require the vehicle to brake at a high enough magnitude to provide sufficient excitation for observer convergence. For instance, in order to estimate non-linear effects, the system needs to operate temporarily in the non-linear region As discussed herein, the acceleration envelope model according to aspects of the technology takes a current best estimate of friction and uses it to adapt the envelope for a given vehicle platform. Identification of the envelope as well as its variation with friction can be conducted through offboard, model-driven analysis. This analysis effectively amounts to identifying the acceleration limits up to which the model remains both stable and controllable as the modeled tire-road friction is varied. In one example, implementation of this model would be lookup-table based, with the lookup tables generated based upon offboard, model-driven analysis to identify the vehicle handling limits.

Several approaches could be employed, including virtual kinematically constrained testing, race line optimization in simulation, and empirical identification by a skilled driver on a closed circuit. With regard to the first approach, the Milliken Moment Method (MMM) may be employed. By generating MMM "runs" across a range of longitudinal inputs, it is then possible to generate a G-G diagram for a given road bank and grade. It is then possible to explore a range of values for road bank and grade and generate a G-G diagram for each road geometry. While this approach could be implemented using a fairly simple model to generate a proof of concept, a more robust approach would be when this approach is implemented with a higher fidelity model that incorporates a semi-empirical tire model and a suspension model with associated lateral and longitudinal load transfer effects.

According to one aspect of the technology, the control component desirably includes both adaptive and reactive sub-components. The adaptive and reactive sub-components have objectives of path tracking and maintaining vehicle stability, respectively. According to another aspect, the system may employ model predictive control.

In another scenario, path tracking control is desirably adaptive in the sense that the feedforward path is able to adapt as the on-line friction estimate changes. For instance, consider the steady-state handling characteristics of an exemplary self-driving vehicle as obtained on dry pavement. In this example, below about 4 m/s$^2$ of lateral acceleration, there may be an approximately linear relationship between lateral acceleration and steer angle. Above about 4 m/s', the relationship becomes nonlinear as the front tires become friction-limited (known as limit understeer). The onset of nonlinearity in this characteristic is friction-dependent, so effective feedforward control will vary with the on-line friction estimate. There is also a possibility that a feedback path would need to be adaptive as well, with a technique such as gain-scheduling used to adapt to changes in the on-line friction estimate.

As noted above, the technology is applicable for various types of self-driving vehicles, including passenger cars, buses, motorcycles, emergency vehicles, RVs, construction vehicles, and large trucks or other cargo carrying vehicles. In addition to using the various intrinsic and extrinsic information for operation of an individual self-driving vehicle, relevant information may also be shared with other self-driving vehicles, such as vehicles that are part of a fleet. Such information may include information relating to road surfaces, weather data, etc.

Figure 8A:
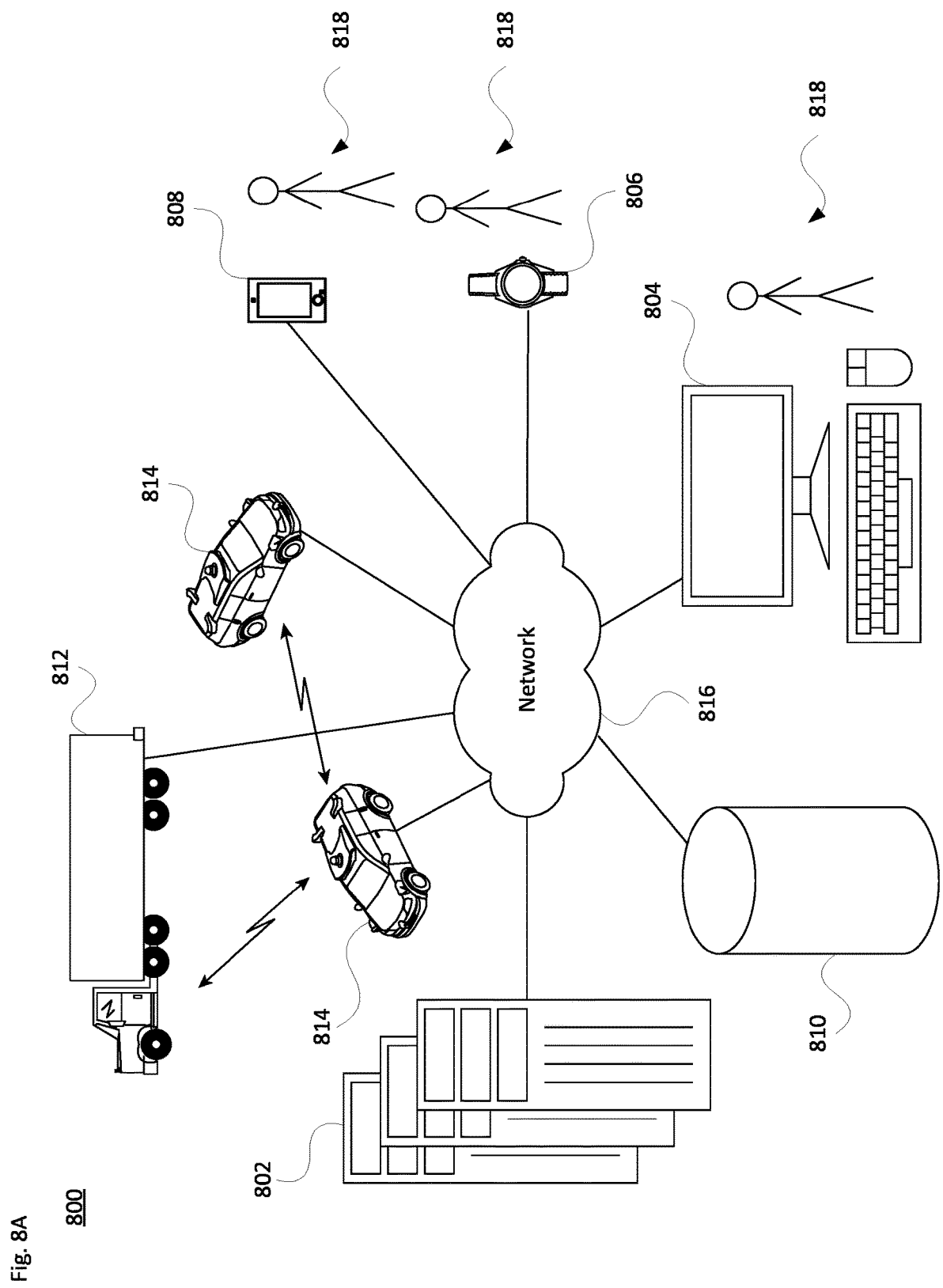
FIGS. 8A-B illustrate an example system in accordance with aspects of the technology.
Figure 8B:
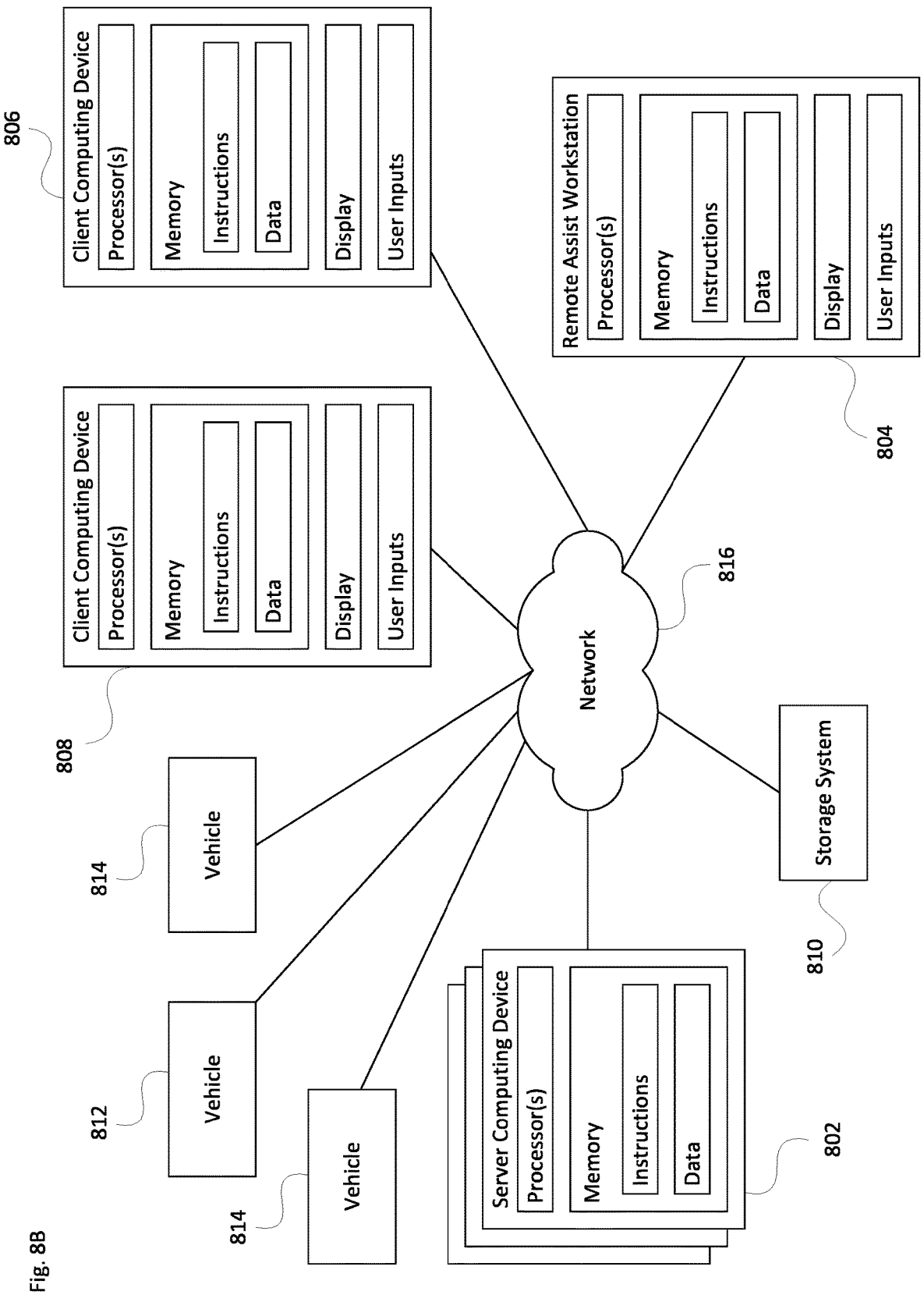

One example of a fleet approach is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100 and 150 of FIGS. 1A-B and 1C-D, respectively. Vehicles 812 and/or vehicles 814 may be part of a fleet of vehicles. Although only a few vehicles and computing devices are depicted for simplicity, a typical system may include significantly more.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communication directly or indirectly via one or more networks, such as network 816. The network 816, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of self-driving vehicles that can be dispatched by a server computing device to various locations. In this regard, the computing device 802 may function as a dispatching server computing system which can be used to dispatch vehicles to different locations in order to pick up and drop off passengers or to pick up and deliver cargo. In addition, server computing device 802 may use network 816 to transmit and present information to a user of one of the other computing devices or a passenger of a vehicle. In this regard, computing devices 804, 806 and 808 may be considered client computing devices.

As shown in FIG. 8A each client computing device 804, 806 and 808 may be a personal computing device intended for use by a respective user 818, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with drivers of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help evaluate extrinsic information such as road surface type, road grade, road banking, or wind gusts and their impact on estimating the local friction envelope. It may also be used to classify such information, and/or identify appropriate responses (e.g., an available acceleration model, traction generation or other operating plan) by the self-driving vehicle. The result of this evaluation may be provided to one or more other vehicles traveling along the same section of roadway. Additionally, this also might be the process used for obtaining labeled data to: 1) evaluate the accuracy of this approach; and 2) train any nets involved.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. For instance, the storage system 810 may store autonomous vehicle control software which is to be used by vehicles, such as vehicles 812 or 814, to operate such vehicles in an autonomous driving mode. Storage system 810 may also store driver-specific or nominal driving models, as well as models of the tires and vehicle dynamics. The model information may be shared with specific vehicles or the fleet as needed. It may be updated in real time, periodically, or off-line as additional driving information is obtained. The storage system 810 can also include detailed map information, route information, weather information, etc. This information may be shared with the vehicles 812 and 814, for instance to help with real-time driving or route planning by a particular vehicle.

Figure 9:
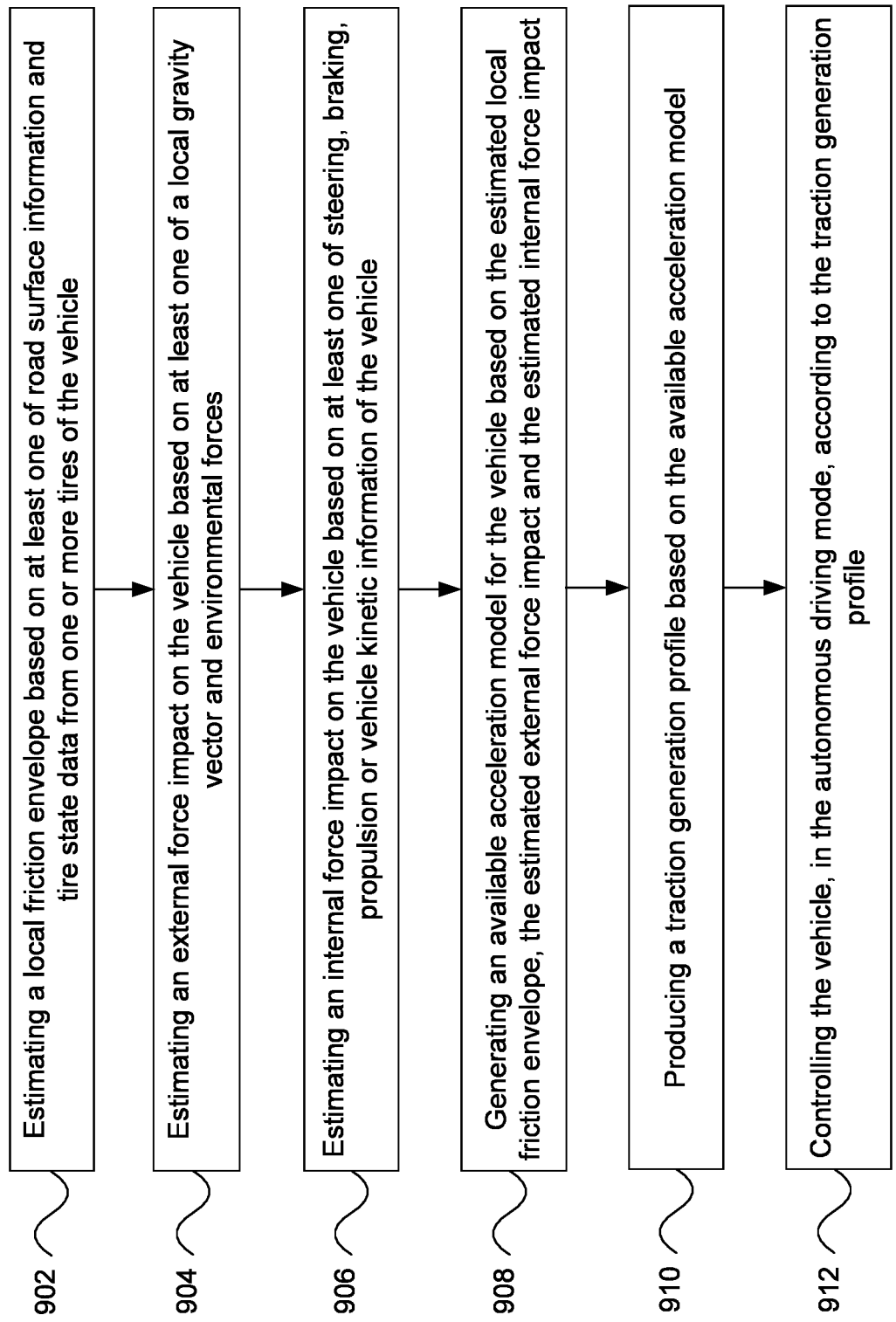
FIG. 9 illustrates an example method in accordance with aspects of the technology.

FIG. 9 illustrates an example method of operation 900 in accordance with the above discussions for operating a vehicle in an autonomous driving mode. As shown in block 902, the method includes estimating, by one or more processors of the vehicle, a local friction envelope based on at least one of road surface information and tire state data from one or more tires of the vehicle. At block 904, an external force impact on the vehicle is estimated based on at least one of a local gravity vector and environmental forces. At block 906, an internal force impact on the vehicle is estimated based on at least one of steering, braking, propulsion or vehicle kinetic information of the vehicle. At block 908, the system generates an available acceleration model for the vehicle based on the estimated local friction envelope, the estimated external force impact and the estimated internal force impact. At block 910, a traction generation profile is produced based on the available acceleration model. And at block 912 the vehicle is controlled in the autonomous driving mode according to the traction generation profile.

FIG. 10 illustrates an example method of operation 1000 in accordance with the above discussions for operating a vehicle in an autonomous driving mode. This includes, as shown in block 1002, generating an initial friction estimation based on a road surface classification for a portion of a roadway and weather data for an external environment of the vehicle. Generating, per block 1004, an on-line friction estimate based on the initial friction estimation, pose information of the vehicle on the portion of the roadway, and wheel speed information of the vehicle. Generating, per block 1006, a set of acceleration limits based on the on-line friction estimate and the pose information. And controlling the vehicle along the roadway in the autonomous driving mode according to the set of acceleration limits, as shown in block 1008.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method of operating a vehicle in an autonomous driving mode, the method comprising:
   generating, by one or more processors of the vehicle, an initial friction estimation based on a road surface classification for a portion of a roadway and weather data for an external environment of the vehicle;
   generating, by the one or more processors, an on-line friction estimate based on the initial friction estimation, pose information of the vehicle on the portion of the roadway, and wheel speed information of the vehicle;
   generating, by the one or more processors, a set of acceleration limits based on the on-line friction estimate and the pose information, the set of acceleration limits corresponding to an acceleration envelope of both longitudinal acceleration and lateral acceleration; and controlling the vehicle along the roadway, by the one or more processors in the autonomous driving mode, according to the set of acceleration limits;

wherein the set of acceleration limits is associated with a set of corrective control inputs and a set of primary control inputs, the set of corrective control inputs being obtained from the on-line friction estimate and the pose information, and the set of primary control inputs being obtained from the on-line friction estimate and trajectory information of the vehicle.

2. The method of claim 1, wherein generating the initial friction estimate includes adjusting friction bounds according to a wetness along the portion of the roadway.

3. The method of claim 1, wherein generating the initial friction estimate includes weighting the road surface classification more heavily than the weather data.

4. The method of claim 1, wherein the on-line friction estimate is further based on additional information associated with how much torque is applied to one or more tires of the vehicle.

5. The method of claim 4, wherein the additional information includes at least one of actuation forces or a tire normal force estimation.

6. The method of claim 1, wherein the on-line friction estimate is adaptive in real-time during driving along the portion of the roadway in accordance with the pose information and wheel speed information.

7. The method of claim 1, wherein generating the set of acceleration limits includes generating a set of corrective control inputs and recovery state information, the recovery state information being provided to a motion planner of the vehicle.

8. The method of claim 7, wherein the recovery state information provides a target trajectory for stabilizing the vehicle.

9. The method of claim 1, wherein controlling the vehicle is performed based on a combination of the corrective control inputs and the primary control inputs.

10. A vehicle configured to operate in an autonomous driving mode, the vehicle comprising:

a driving system including a steering subsystem, an acceleration subsystem and a deceleration subsystem to control driving of the vehicle in the autonomous driving mode;

a positioning system configured to determine a current position of the vehicle; and a control system including one or more processors, the control system operatively coupled to the driving system and the positioning system, the control system being configured to:

generate an initial friction estimation based on a road surface classification for a portion of a roadway and weather data for an external environment of the vehicle;

generate an on-line friction estimate based on the initial friction estimation, pose information of the vehicle on the portion of the roadway, and wheel speed information of the vehicle;

generate a set of acceleration limits based on the on-line friction estimate and the pose information, the set of acceleration limits corresponding to an acceleration envelope of both longitudinal acceleration and lateral acceleration; and control the vehicle along the roadway in the autonomous driving mode according to the set of acceleration limits;

wherein the set of acceleration limits is associated with a set of corrective control inputs and a set of primary control inputs, the set of corrective control inputs being obtained from the on-line friction estimate and the pose information, and the set of primary control inputs being obtained from the on-line friction estimate and trajectory information of the vehicle.

11. The vehicle of claim 10, wherein generation of the initial friction estimate includes adjustment of friction bounds according to a wetness along the portion of the roadway.

12. The vehicle of claim 10, wherein generation of the initial friction estimate includes weighting the road surface classification more heavily than the weather data.

13. The vehicle of claim 10, wherein the on-line friction estimate is further based on additional information associated with how much torque is applied to one or more tires of the vehicle.

14. The vehicle of claim 13, wherein the additional information includes at least one of actuation forces or a tire normal force estimation.

15. The vehicle of claim 10, wherein the on-line friction estimate is adaptive in real-time during driving along the portion of the roadway in accordance with the pose information and wheel speed information.

16. The vehicle of claim 10, wherein generation of the set of acceleration limits includes generation of a set of corrective control inputs and recovery state information, the recovery state information being provided to a motion planner module of the control system.

17. The vehicle of claim 16, wherein the recovery state information provides a target trajectory for stabilizing the vehicle.

18. The vehicle of claim 10, wherein control of the vehicle is performed based on a combination of the corrective control inputs and the primary control inputs.

* * * * *